(12) United States Patent
Veine et al.

(10) Patent No.: US 6,983,995 B1
(45) Date of Patent: Jan. 10, 2006

(54) LINEAR ADJUSTABLE HEAD RESTRAINT

(75) Inventors: Eric Veine, Madison Heights, MI (US); Nagarjun Yetukuri, Rochester Hills, MI (US); Gerald S. Locke, Lake Orion, MI (US); Dale Smallwood, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 10/711,562

(22) Filed: Sep. 24, 2004

(51) Int. Cl.
*A47C 7/36* (2006.01)

(52) U.S. Cl. ..................................... 297/391
(58) Field of Classification Search ............... 297/407, 297/406, 391, 409, 463.1, 463.2; 29/428
See application file for complete search history.

(56) References Cited

U.S. PATENT DOCUMENTS

| | | | | |
|---|---|---|---|---|
| 1,471,168 A | * | 10/1923 | Katz | 297/404 |
| 2,666,476 A | * | 1/1954 | Lycan | 297/404 |
| 4,191,422 A | * | 3/1980 | Inasawa et al. | 297/391 |
| 4,205,878 A | * | 6/1980 | Wooten | 297/391 |
| 4,265,482 A | | 5/1981 | Nishimura et al. | |
| 4,278,291 A | * | 7/1981 | Asai | 297/391 |
| 4,304,439 A | | 12/1981 | Terada et al. | |
| 4,657,304 A | * | 4/1987 | Heesch et al. | 297/391 |
| 4,762,367 A | * | 8/1988 | Denton | 297/409 |
| 4,856,848 A | * | 8/1989 | O'Sullivan et al. | 297/391 |
| 5,080,436 A | * | 1/1992 | Meiller | 297/391 |
| 5,238,295 A | | 8/1993 | Harrell | |
| 6,302,485 B1 | | 10/2001 | Nakane et al. | |
| 6,499,805 B1 | | 12/2002 | Watadani | |
| 6,533,359 B1 | * | 3/2003 | Holstensson | 297/391 |
| 6,616,236 B1 | * | 9/2003 | Su | 297/410 |

* cited by examiner

*Primary Examiner*—Milton Nelson, Jr.
(74) *Attorney, Agent, or Firm*—Earl LaFontaine

(57) ABSTRACT

An automotive seat assembly is provided including a seatbase defining a seatbase plane and a seatback defining a seatback plane. The automotive seat assembly includes an automotive head restraint assembly comprising a head restraint support member configured to extend vertically from the seatback. The head restraint support member has a vertical extension portion extending generally parallel to the seatback plane and at least one horizontal travel arm generally perpendicular to the seatback plane. The vertical extension portion positioned between the seatback and the at least one horizontal travel arm. A head restraint inner structure engages the at least one horizontal travel arm such that the head restraint inner structure is movable linearly to a plurality of positions along the at least one horizontal travel arm. A head restraint outer structure surrounds said head restraint inners structure to provide a comfortable outer surface.

15 Claims, 5 Drawing Sheets

LINEAR ADJUSTABLE HEAD RESTRAINT

TECHNICAL FIELD

The present invention relates generally to an automotive seat assembly and more particularly to an automotive seat assembly with a linear adjustable head restraint.

BACKGROUND OF THE INVENTION

The design features within an automobile provide a balance between comfort and safety. Additionally, these design features must commonly be ergonomically adapted to engage a wide variety of occupant shapes and sizes. Often, however, in the attempt to cover the wide variety of shapes and sizes, individualized adjustment can take a secondary position. While this may be necessary in some circumstances, in other design situations novel inventive progressions may allow personalized adjustment to remain on the same level as universality of operation.

An example of an automotive design feature that epitomizes this balance can be found in head restraints also known as head rests. Design for these head restraints commonly involves placement to minimize rearward head movement during vehicle impact. Designs commonly provide minimal adjustment features as they are primarily considered extensions of the vehicle seat. They are commonly provided with vertical adjustments such that they can accommodate occupants of varying heights. Further features to customize the head restraint to an individuals size, shape, or individualized comfort preferences are generally absent from head restraint design. Occupants, similar to personalities, can have an infinite range of seating preferences. Head restraint position, relative to the seatback, can provide comfort to occupants based on their preferences. Additional adjustment features, therefore, would provide occupants with greater comfort.

Additionally, by adding new adjustment features to a head restraint assembly it may be possible to minimize the distance between the head restraint and the occupants head. This distance can be used to reduce occupant head travel and thereby may be utilized to minimize stress imparted to the occupant during vehicle impact. It would, therefore, be highly desirable to have a head restraint assembly with advanced individualized adjustment features. It would additionally be highly desirable to have a head restraint assembly that provided fore/aft adjustment features such that the distance between the occupants head and the head restraint could be minimized.

SUMMARY OF THE INVENTION

It is, therefore, an object of the present invention to provide an automotive seat assembly with an adjustable head restraint assembly. It is a further object of the present invention to provide such a head restraint assembly that includes a head restraint that is movable linearly between a horizontal range of positions.

An automotive seat assembly is provided including a seatbase defining a seatbase plane and a seatback defining a seatback plane. The automotive seat assembly includes an automotive head restraint assembly comprising a head restraint support member configured to extend vertically from the seatback. The head restraint support member has a vertical extension portion extending generally parallel to the seatback plane and at least one horizontal travel arm generally perpendicular to the seatback plane. The vertical extension portion positioned between the seatback and the at least one horizontal travel arm. A head restraint inner structure engages the at least one horizontal travel arm such that the head restraint inner structure is movable linearly to a plurality of positions along the at least one horizontal travel arm. A head restraint outer structure surrounds said head restraint inners structure to provide a comfortable outer surface.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
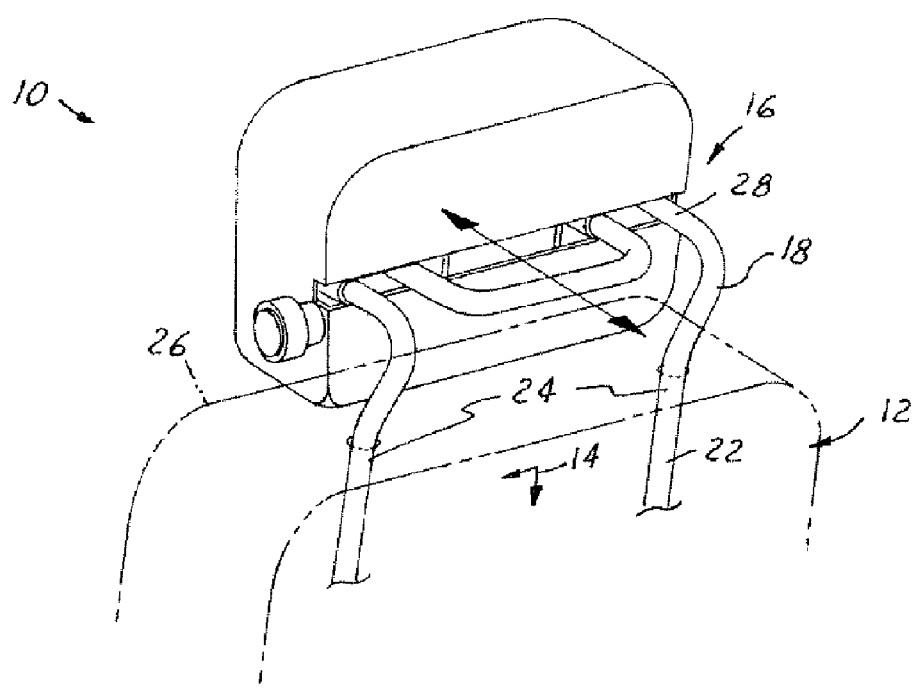
FIG. 1 is an illustration of an automotive seat assembly in accordance with the present invention.
Figure 2:
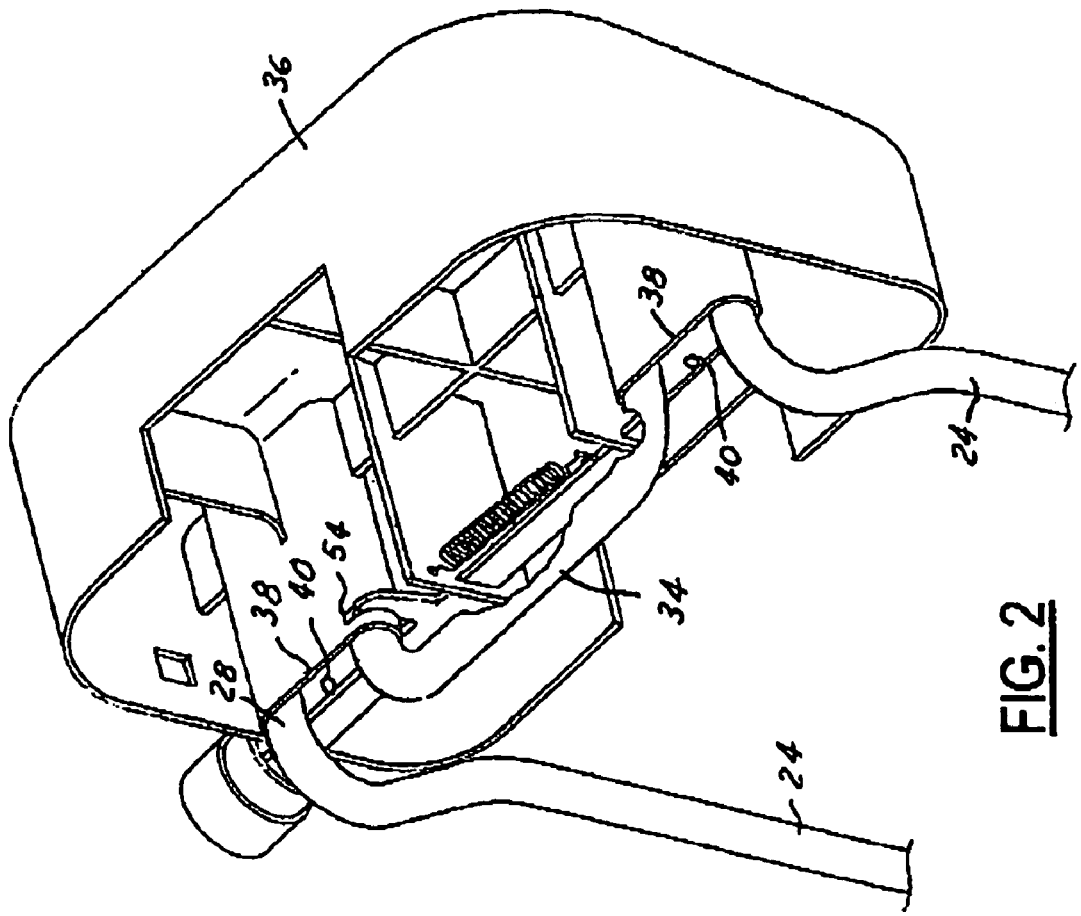
FIG. 2 is a detailed illustration of the head restraint assembly for use in the automotive seat assembly illustrated in FIG. 1.

Referring now to FIGS. 1 and 2, which are illustrations of an automotive seat assembly 10 in accordance with the present invention. The automotive seat assembly 10 illustrated is intended to encompass a wide variety of seating configurations for both front and read automotive seats. The automotive seat assembly 10 includes a seatback 12 defining a seatback plane 14 as is well understood in the art. A head restraint assembly 16 is intended for use in conjunction with the seatback 12 for further passenger comfort and safety. The present invention provides a unique and beneficial head restraint assembly 16 to provide an increase in the comfort and safety of the automotive seat assembly 10.

The automotive head restraint assembly 16 includes a head restraint support member 18 mounted to and extending vertically from the seatback 12. The head restraint support member 18 may be manufactured in a variety of fashions. However one particular embodiment contemplates a novel two-piece tubular support member 18 wherein the two pieces can be manufactured using simple machining techniques and joined with a weld 20 to form a single head restraint support member 18. The head restraint support member 18 includes a vertical extension portion 22 commonly comprising two vertical extension arms 24 extending from the seatback upper surface 26 generally parallel to the seatback plane 14. The head restraint support member 18 further includes at least one horizontal travel arm 28 orientated generally perpendicular to the seatback plane 14 and generally perpendicular, therefore, to the vertical extension portion 22. The term generally perpendicular is intended to embody the fact that the horizontal travel arm 28 provide a generally fore/aft orientation within the vehicle.

Figure 3:
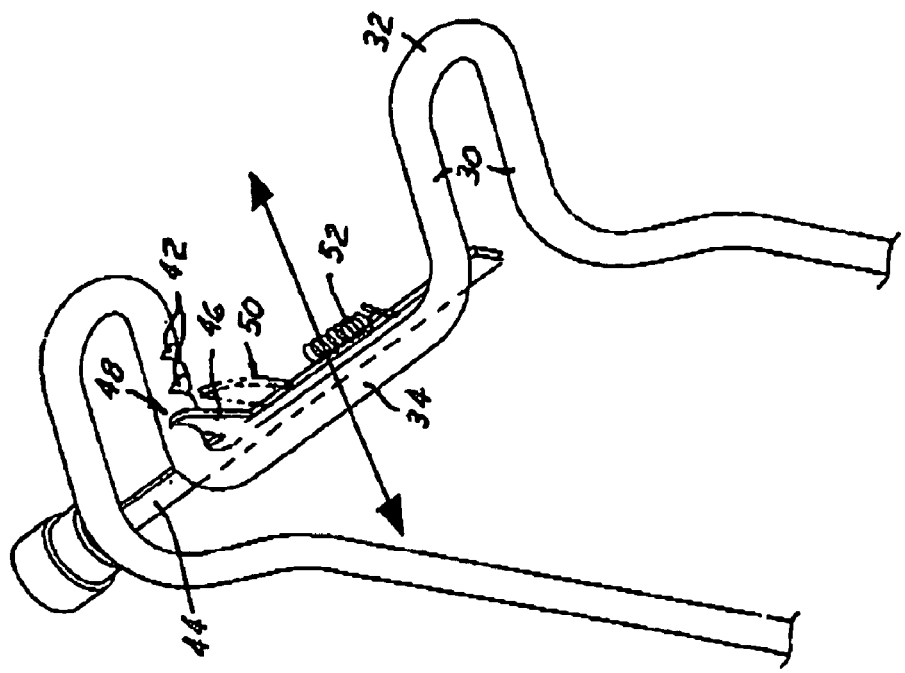
FIG. 3 is a detailed illustration of the head restraint support member for use in the head restraint assembly illustrated in FIG. 2.

Although a variety of horizontal travel arms 28 are contemplated, one embodiment contemplates the use of a pair of horizontal travel arms 28, each formed with parallel side arms 30 having an arced travel arm end 32 (see FIG. 3). A horizontal base arm 34 is positioned between the two horizontal travel arms 28. The advantage of this configuration is that it allows the head restraint support member 18 to be formed by simple bending of a tubular element. In addition the arced travel arm ends 32 and the horizontal base arms 34 can be utilized as stops for limiting motion of a head restraint inner structure 36.

Figure 4:
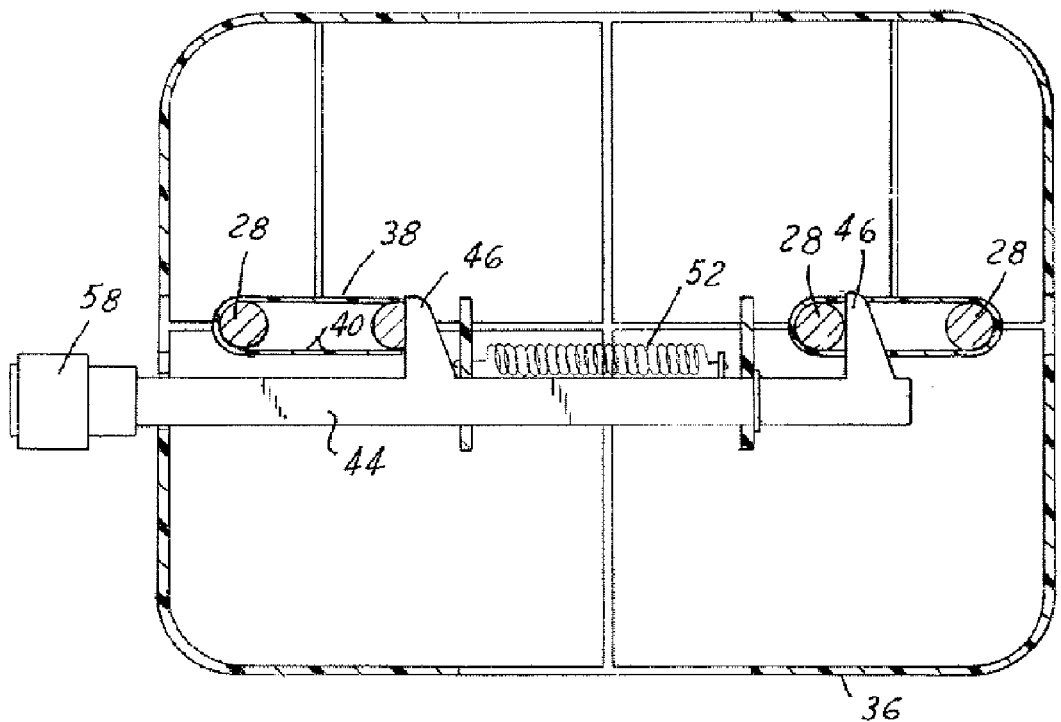
FIG. 4 is a cross-sectional illustration of the head restraint assembly for use in the automotive seat assembly illustrated in FIG. 1.

The head restraint inner structure 36 engages the horizontal travel arm(s) 28 such that it is movable along these travel arms 28 linearly through a plurality of position. This gives the head restraint inner structure 36 fore/aft adjustment abilities within the vehicle while retaining its orientation. Although this may be accomplished in a variety of fashions, one embodiment contemplates the use of one or more travel channels 38 formed through the head restraint inner structure 36 (See FIGS. 2 and 4). The travel arms 28 are positioned within the travel channels 38 such that the head restraint inner structure 36 is constrained into linear travel along the horizontal travel arms 28. This configuration helps prevent jamming during movement and insures proper alignment. It is contemplated that the head restraint inner structure 36 be formed from cast polymer although variety of materials and manufacturing techniques are contemplated. In addition, as described above, the travel channels 38 either alone or in combination with stop features 40 may be used to limit motion of the head restraint inner structure.

It is desirable for the head restraint inner structure 36 to not only be movable to a variety of positions along the travel arms 28, but to be secured in each of these plurality of positions as well. To this end, the present invention includes a plurality of engagement notches 42 formed in the at least one travel arm 28. A locking arm 44 is mounted to the head restraint inner structure 36 and includes a locking blade 46 designed to engage one of the plurality of engagement notches 42 when in a locking arm engagement position 48. The locking arm is 44 is additionally movable into a locking arm disengagement position 50 wherein the locking blade 46 moves out of contact with the engagement notches 42 and the head restraint inner structure 36 is free to move along the horizontal travel arm 28. The locking arm 44 is preferably biased towards the locking arm engagement position 48. This can be accomplished in a variety of fashions such as through the use of a locking arm biasing spring 52 in communication with the locking arm 42 and the head restraint inner structure 36. A channel guide 54 formed in the head restraint inner structure 36 can act as a guide for the locking blade 46 in addition to preventing rotational torque from being transferred to the locking arm 44. In at least one embodiment, the plurality of engagement notches 42 are unidirectional wherein they only engage in one direction. By way of example, they may be unidirectional such that the head restraint inner structure 36 may be moved forward even when the locking arm 44 is in the locking arm engagement position 48.

Figure 5:
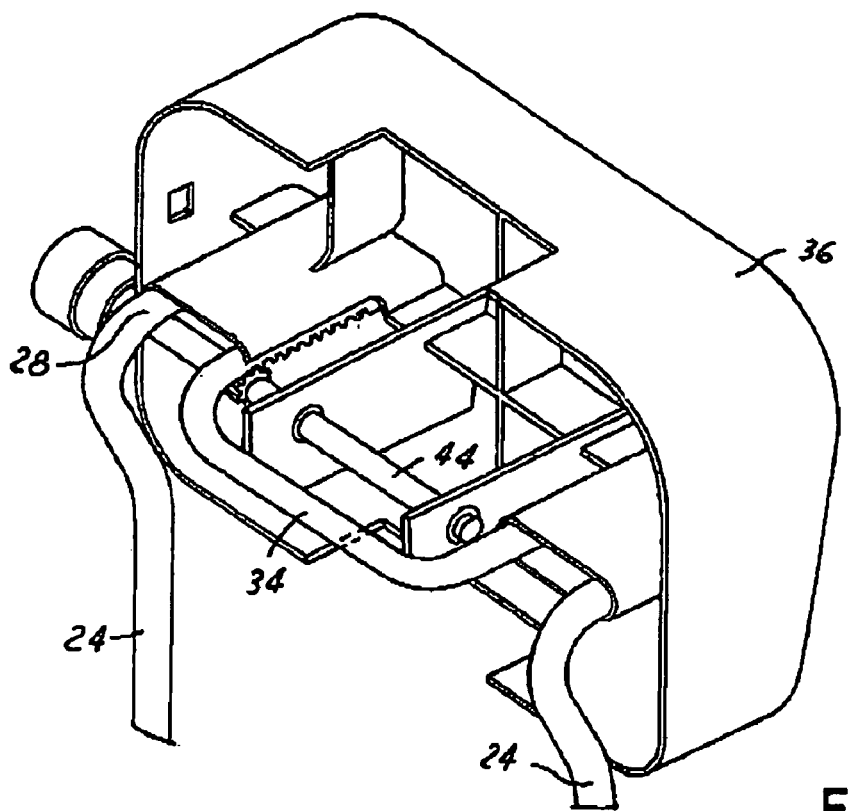
FIG. 5 is an alternate embodiment of the head restraint assembly for use in the automotive seat assembly illustrated in FIG. 1.
Figure 6:
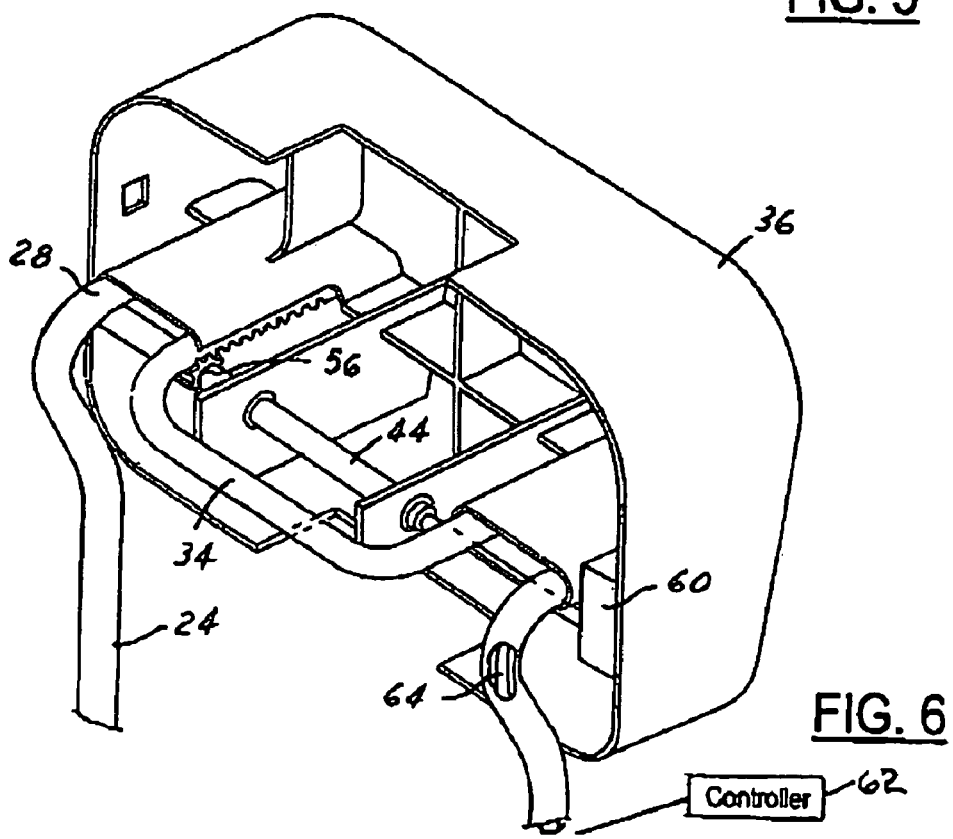
FIG. 6 is an alternate embodiment of the head restraint assembly for use in the automotive seat assembly illustrated in FIG. 1.
Figure 7:
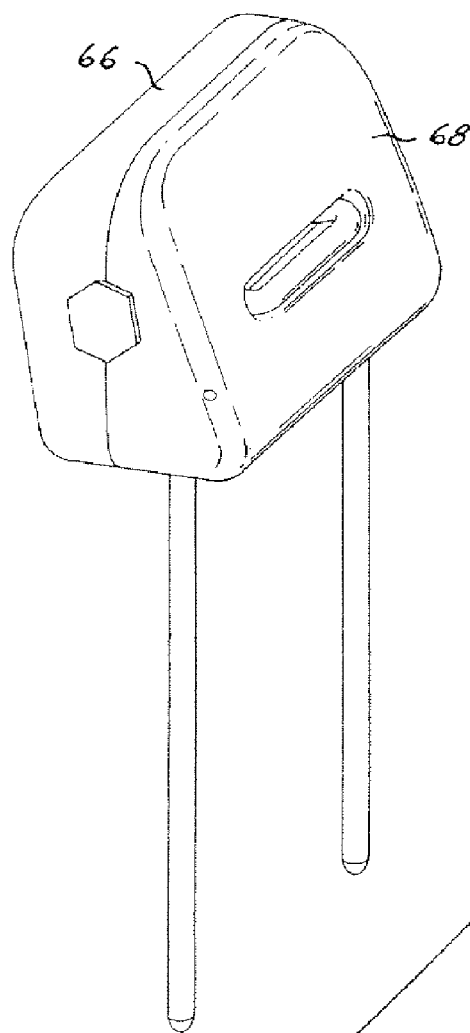
FIG. 7 is an illustration of a head restraint assembly for use in the automotive seat assembly illustrated in FIG. 1.
Figure 8:
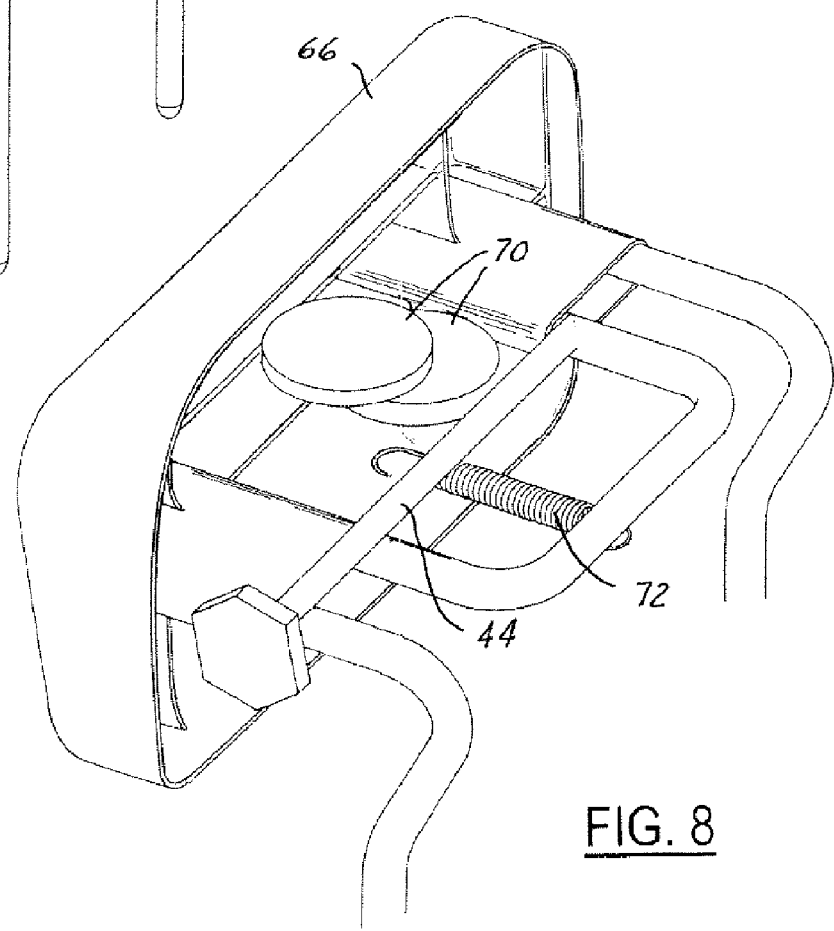
FIG. 8 is a detailed illustration of a portion of the head restraint assembly illustrated in FIG. 7, the detail illustrating the rear head restraint inner structure removed.
Figure 9:
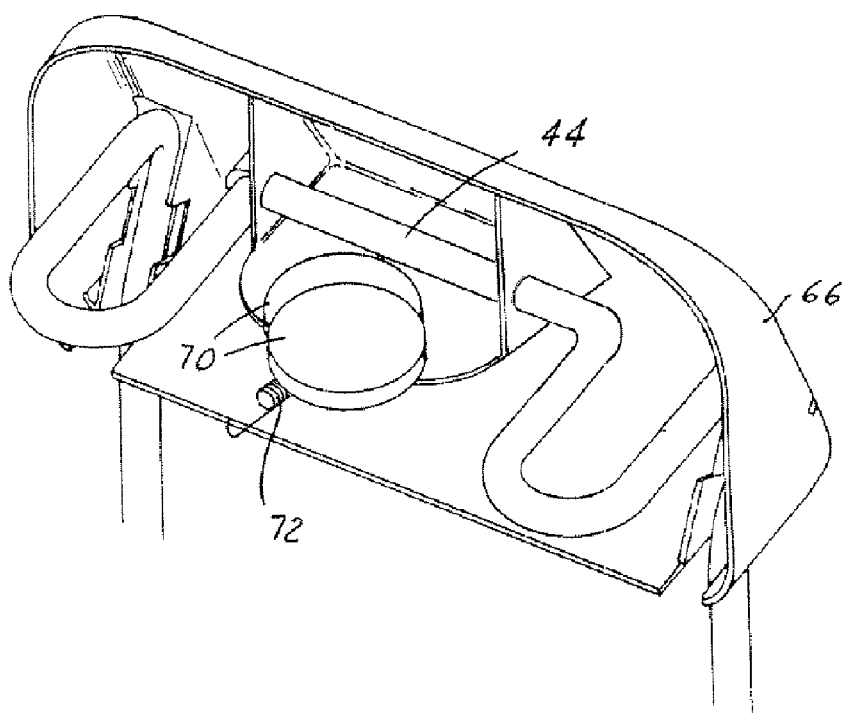
FIG. 9 is a detailed illustration of a portion of the head restraint assembly illustrated in FIG. 8, the detail illustrating the forward head restraint inner structure removed.

The locking arm 44 and engagement notches 42 as described represent only a single embodiment of the present invention. In other embodiments, the locking arm 44 may include a gearing assembly 56 that engages the engagement notches 42 (see FIG. 5). In such an embodiment, rotation of the locking arm 44, such as through the use of an operator's knob 58, can be used to transfer rotational drive to the engagement notches 42 and thereby allow the head restraint inner structure 36 to be moved through a plurality of positions along the horizontal travel arm 28. In addition, a motor assembly 60 may be utilized instead of manual actuation (see FIG. 6). The motor assembly 60 is preferably mounted directly to the head restraint inner structure 36. In such a case the motor assembly 60 may be placed in communication with a controller 62 positioned remotely in the vehicle by way of a wire harness 64 or other such communications method. In this fashion, controls for movement of the head restraint inner structure 36 may be placed in any convenience and ergonomic position within the vehicle. Additionally, if a hollow tube head restraint support member 18 is utilized, the wire harness 64 may be positioned within the head restraint support member 18 such that is can be strung into the seatback 12 while remaining conspicuous to the operator.

Figure 10:
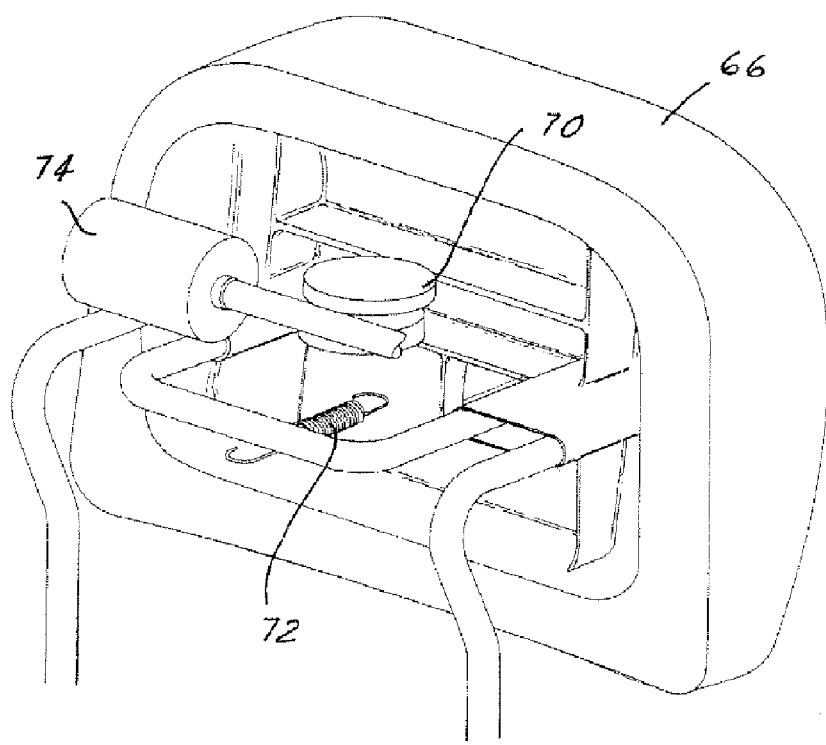
FIG. 10 is an alternate embodiment of the detailed illustration shown in FIG. 8, the detail illustrating the use of a motor assembly.

In an alternate embodiment illustrated in FIGS. 7 through 10, the head restraint inner structure 36 may be comprised of a forward head restraint inner structure 66 and a rear head restraint inner structure 68. In this embodiment the locking arm 44 is mounted to the head restraint support member 18. This may be accomplished in a variety of fashions such as mounting the locking arm 44 to the rear head restraint inner structure 68 which in turn is mounted to the head restraint support member 18. A cam assembly 70 is positioned between the locking arm 44 and the forward head restraint inner structure 66 and is in communication with both the arm 44 and the structure 66 such that rotation of the locking arm 44 rotates the cam assembly 70 and forces the forward head restraint inner structure 66 forward. A head restraint support structure biasing spring 72 can be utilized to bias the head restraint inners structure 36 against the cam assembly 70. This is beneficial as the cam assembly 70 provides forward control of the head restraint inner structure 36 without a rigid physical connection. As shown in FIG. 10, a motor assembly 74 may be mounted to the rear head restraint inner structure 68 and control rotation of the locking arm 44. This can be utilized to allow electronic control of the forward head restraint inner structure 66 positioning.

While particular embodiments of the invention have been shown and described, numerous variations and alternative embodiments will occur to those skilled in the art. Accordingly, it is intended that the invention be limited only in terms of the appended claims.

What is claimed is:

1. An automotive head restraint assembly for use in an automotive seat assembly having a seatback defining a seatback plane, said automotive head restraint assembly comprising:

a head restraint support member configured to extend from a seatback, said head restraint support member having at least one horizontal travel arm generally perpendicular to a seatback plane; and a head restraint inner structure engaging said at least one horizontal travel arm, said head restraint inner structure movable linearly to a plurality of positions along said at least one horizontal travel arm, said head restraint support member comprising a tubular support member, said at least one horizontal travel arm comprising a pair of horizontal travel arms each having two parallel side arms joined by an arced travel arm end.

2. An automotive head restraint assembly as described in claim 1, further comprising:
   a travel channel formed through said head restraint inner structure, said at least one horizontal travel arm positioned within said travel channel, said travel channel engaging said at least one horizontal travel arm such that said head restraint inner structure is constrained into linear travel along said at least one horizontal travel arm.

3. An automotive head restraint assembly as described in claim 1, further comprising;
   a plurality of engagement notches formed on said at least one horizontal travel arm; and
   a locking arm mounted to said head restraint inner structure, said locking arm biased to engage said plurality of engagement notches, said locking arm movable between a locking arm engagement position and a locking arm disengagement position, said locking arm disengagement position allowing said head restraint inner structure to be movable linearly to a plurality of positions along said at least one horizontal travel arm.

4. An automotive head restraint assembly as described in claim 3, wherein said plurality of engagement notches comprises:
   a plurality of uni-directional engagement notches, said uni-directional engagement notches allowing said head restraint inner structure to be movable relative to said at least one horizontal travel arm in a single direction when said locking arm is in said locking arm engagement position.

5. An automotive head restraint assembly as described in claim 3, wherein said locking arm includes a locking blade, said locking blade movable within a guide channel formed in said head restraint inner structure, said locking blade engaging said plurality of engagement notches when said locking arm is in said locking arm engagement position.

6. An automotive head restraint assembly for use in an automotive seat assembly having a seatback defining a seatback plane, said automotive head restraint assembly comprising:
   a head restraint support member configured to extend from the seatback, said head restraint support member having at least one horizontal travel arm configured to be generally perpendicular to the seatback plane; and
   a head restraint inner structure engaging said at least one horizontal travel arm, said head restraint inner structure movable linearly to a plurality of positions along said at least one horizontal travel arm,
   a locking arm mounted in rigid positional communication with said head restraint support member; and
   a cam assembly positioned between and in communication with said locking arm and said head restraint inner structure, said cam assembly forcing said head restraint inner structure forward in response to rotation of said locking arm, said head restraint inner structure biased rearward against said cam assembly.

7. An automotive head restraint assembly as described in claim 6, further comprising:
   a motor assembly in communication with said locking arm, said motor assembly controlling positioning of said head restraint inner structure relative to said at least one horizontal travel arm; and
   a controller in communication with said motor assembly.

8. An automotive head restraint assembly as described in claim 7, wherein said head restraint support member comprises a hollow tubular support member, said controller in communication with said motor assembly by way of a wiring assembly positioned within said hollow tubular support member.

9. A method of providing linear fore/aft motion to an automotive head restraint assembly comprising:
   mounting a head restraint support member to a seatback, said head restraint support member having at least one horizontal travel arm generally perpendicular to said seatback plane;
   mounting a head restraint inner structure to said head restraint support member such that a travel channel formed in said head restraint inner structure engages said at least one horizontal travel arm, said head restraint inner structure movable linearly to a plurality of positions along said at least one horizontal travel arm,
   moving said head restraint inner structure through said plurality of positions utilizing a locking arm mounted to said head restraint inner structure, said locking arm including a gearing assembly engaging a plurality of engagement notches formed on said at least one horizontal travel arm;
   rotating said locking arm to move said head restraint inner structure relative to said at least one horizontal travel arm,
   rotating said locking arm using a motor assembly in communication with said locking arm; and
   controlling said motor assembly utilizing a controller in communication with said motor assembly.

10. An automotive seat assembly comprising:
    a seatback defining a seatback plane;
    a head restraint support member configured to extend vertically from said seatback, said head restraint support member having a vertical extension portion extending generally parallel to said seatback plane and at least one horizontal travel arm generally perpendicular to said seatback plane, said vertical extension portion positioned between said seatback and said at least one horizontal travel arm; and
    a head restraint inner structure including at least one travel channel, said at least one travel channel engaging said at least one horizontal travel arm, said head restraint inner structure movable linearly to a plurality of positions along said at least one horizontal travel arm, said head restraint support member comprises a tubular support member, said at least one horizontal travel arm comprising a pair of horizontal travel arms.

11. An automotive seat assembly as described in claim 10, further comprising:
    a plurality of engagement notches formed on said at least one horizontal travel arm; and
    a locking arm mounted to said head restraint inner structure, said locking arm including a gearing assembly engaging said plurality of engagement notches, said locking arm rotatable such that said head restraint inner structure to be movable linearly to a plurality of positions along said at least one horizontal travel arm in response to rotation of said gearing assembly.

12. An automotive seat assembly as described in claim 10, further comprising:
    a plurality of engagement notches formed on said at least one horizontal travel arm; and
    an locking arm mounted to said head restraint inner structure, said locking arm biased to engage said plurality of engagement notches, said locking arm movable between a locking arm engagement position and a locking arm disengagement position, said locking arm disengagement position allowing said head restraint inner structure to be movable linearly to a plurality of positions along said at least one horizontal travel arm.

13. An automotive seat assembly comprising:

a seatback defining a seatback plane;

a head restraint support member configured to extend vertically from said seatback, said head restraint support member having a vertical extension portion extending generally parallel to said seatback plane and at least one horizontal travel arm generally perpendicular to said seatback plane, said vertical extension portion positioned between said seatback and said at least one horizontal travel arm; and a head restraint inner structure including at least one travel channel, said at least one travel channel engaging said at least one horizontal travel arm, said head restraint inner structure movable linearly to a plurality of positions along said at least one horizontal travel arm, a plurality of engagement notches formed on said at least one horizontal travel arm; and an locking arm mounted to said head restraint inner structure, said locking arm biased to engage said plurality of engagement notches, said locking arm movable between a locking arm engagement position and a locking arm disengagement position, said locking arm disengagement position allowing said head restraint inner structure to be movable linearly to a plurality of positions along said at least one horizontal travel arm, a plurality of uni-directional engagement notches, said uni-directional engagement notches allowing said head restraint inner structure to be movable relative to said at least one horizontal travel arm in only a single horizontal direction when said locking arm is in said locking arm engagement position.

14. An automotive seat assembly comprising:

a seatback defining a seatback plane;

a head restraint support member configured to extend vertically from said seatback, said head restraint support member having a vertical extension portion extending generally parallel to said seatback plane and at least one horizontal travel arm generally perpendicular to said seatback plane, said vertical extension portion positioned between said seatback and said at least one horizontal travel arm; and a head restraint inner structure including at least one travel channel, said at least one travel channel engaging said at least one horizontal travel arm, said head restraint inner structure movable linearly to a plurality of positions along said at least one horizontal travel arm, a plurality of engagement notches formed on said at least one horizontal travel arm; and a locking arm mounted to said head restraint inner structure, said locking arm including a gearing assembly engaging said plurality of engagement notches, said locking arm rotatable such that said head restraint inner structure to be movable linearly to a plurality of positions along said at least one horizontal travel arm in response to rotation of said gearing assembly, a motor assembly in communication with said locking arm, said motor assembly controlling positioning of said head restraint inner structure relative to said at least one horizontal travel arm; and a controller in communication with said motor assembly.

15. An automotive seat assembly as described in claim 14, wherein said head restraint support member comprises a hollow tubular support member, said controller in communication with said motor assembly by way of a wiring assembly positioned within said hollow tubular support member.

* * * * *